United States Patent Office 3,398,024
Patented Aug. 20, 1968

3,398,024
BATTERY PLATES
Stanley Charles Barnes, Kenilworth, and John Armstrong, London, England, assignors to Joseph Lucas (Industries) Limited, Birmingham, England
No Drawing. Filed Dec. 30, 1965, Ser. No. 517,784
5 Claims. (Cl. 136—34)

ABSTRACT OF THE DISCLOSURE

In the formation of a battery plate, a lead grid is pasted in the usual way, except that before the pasting operation, the grid is dipped in ammonium persulfate, sodium persulfate, or sodium perborate solution which will be reduced in preference to oxygen when the paste is added.

---

This invention relates to battery plates of the kind manufactured from a lead grid having adhering thereto a paste containing oxides and/or sulphates of lead mixed with a solution of these compounds.

Where the grid of such a battery plate is formed by casting, it is usual to add antimony to the grid to increase its strength. The antimony and lead cannot be perfectly mixed, and consequently the grid will include lead-rich areas and antimony-rich areas. In such plates current tends to flow through the electrolyte in the paste from the lead-rich to the antimony-rich areas with a resultant corrosion of the lead-rich areas to lead oxide or lead sulphate and reduction of oxygen at the antimony-rich areas. This process, which occurs by chance as a result of the presence of the antimony, is found to have an advantageous effect because the lead oxide or lead sulphate produced at the lead-rich areas is firmly secured to the grid and acts as a key for the paste, so improving the adhesion of the paste to the grid. However, in order for the anodic reaction to take place at the lead-rich areas, the corresponding cathodic reaction must take place at the antimony-rich areas. Although the cathodic reaction does take place, it is slow, partly because antimony is not a good catalyst for the reduction of oxygen, and partly because of the time taken for the oxygen to diffuse through the paste.

The object of the invention is to provide a convenient method of manufacturing a battery plate in which the reactions described in the preceding paragraph will take place more rapidly, so accelerating the adhesion of the paste to the grid. It should be noted that although the theory has been described with reference to cast battery grids, the invention is equally applicable to dispersion-strengthened grids (i.e. grids made from lead with lead oxide dispersed throughout the grid to increase its strength), or other grids which contain no antimony.

A method according to the invention comprises applying to the grid, prior to the addition of the paste, a substance which will be reduced in preference to oxygen when the paste is added.

The invention further resides in a battery plate whenever manufactured by a method as specified in the preceding paragraph.

The substance is conveniently applied to the grid by dipping the grid in a solution of the substance, but it could readily be applied in other ways, for example by spraying. A variety of substances could be used, suitable examples being solutions of ammonium persulphate, sodium persulphate or sodium perborate.

In one example a grid was formed in any convenient known manner. The grid was dipped in a 30% solution of ammonium persulphate, and then pasted while wet. The paste used was a standard paste of composition depending on whether a positive or negative plate was being formed. A similar grid was pasted without being dipped, and it was found that the adhesion of the paste on the dipped grid was as good after 48 hours as the adhesion of the paste on the undipped grid after 72 hours. The dipped plates are used to form a battery after drying in a conventional manner.

Having thus described my invention what I claim as new and desire to secure by Letters Patent is:

1. A method of forming a battery plate of the kind comprising a lead grid having adhering thereto a paste containing oxides and/or sulphates of lead mixed with a solution of these compounds, the method including the step of applying to the grid, prior to the addition of the paste, a substance which will be reduced in preference to oxygen when the paste is added.

2. A method as claimed in claim 1 in which the substance is applied to the grid by dipping the grid in the substance.

3. A method as claimed in claim 1 in which the substance is ammonium persulphate.

4. A method as claimed in claim 1 in which the substance is sodium persulphate.

5. A method as claimed in claim 1 in which the substance is sodium perborate.

References Cited

UNITED STATES PATENTS 2,159,226   5/1939   Reid _____ 136—26.05

OTHER REFERENCES

The Condensed Chemical Dictionary, Sixth ed, 1961, pp. 865, 1048, 1049.

WINSTON A. DOUGLAS, *Primary Examiner.*

C. F. LEFEVOUR, *Assistant Examiner.*